United States Patent [19]
Hudziak

[11] 3,742,965
[45] July 3, 1973

[54] RINSING DEVICE

[76] Inventor: Josephine M. Hudziak, 2115 South 35th St., Milwaukee, Wis. 53215

[22] Filed: Jan. 21, 1972

[21] Appl. No.: 219,769

[52] U.S. Cl................ 134/92, 134/115 R, 134/155, 134/183, 220/23.86
[51] Int. Cl.............................................. B08b 3/04
[58] Field of Search ....................................
134/84–93, 117, 137, 155, 183, 201, 115 R; 220/23.4, 23.83, 23.86

[56] References Cited
UNITED STATES PATENTS

| 590,620 | 9/1897 | Morgan | 134/92 |
| 993,898 | 5/1911 | Starn | 134/91 |
| 1,469,625 | 10/1923 | Dodge | 134/93 X |
| 2,713,347 | 7/1955 | Hazy | 134/92 X |
| 2,791,494 | 5/1957 | Thompson | 134/93 UX |
| 3,212,758 | 10/1965 | Ranson | 134/183 X |
| 3,451,401 | 6/1969 | Levinson | 134/115 R X |

Primary Examiner—Robert L. Bleutge
Attorney—Irwin C. Alter, Phillip A. Weiss and J. Warren Whitesel

[57] ABSTRACT

A small rectangular pan fits into a side or a corner of a sink. Over flow holes are formed in the sides of the pan, near the upper edge thereof. Dishes, cutlery, and the like may be placed in the pan for rinsing, and the pan may be placed under a running faucet. As clean water runs into the pan, it fills to the overflow holes and then the rinse level remains stable.

6 Claims, 5 Drawing Figures

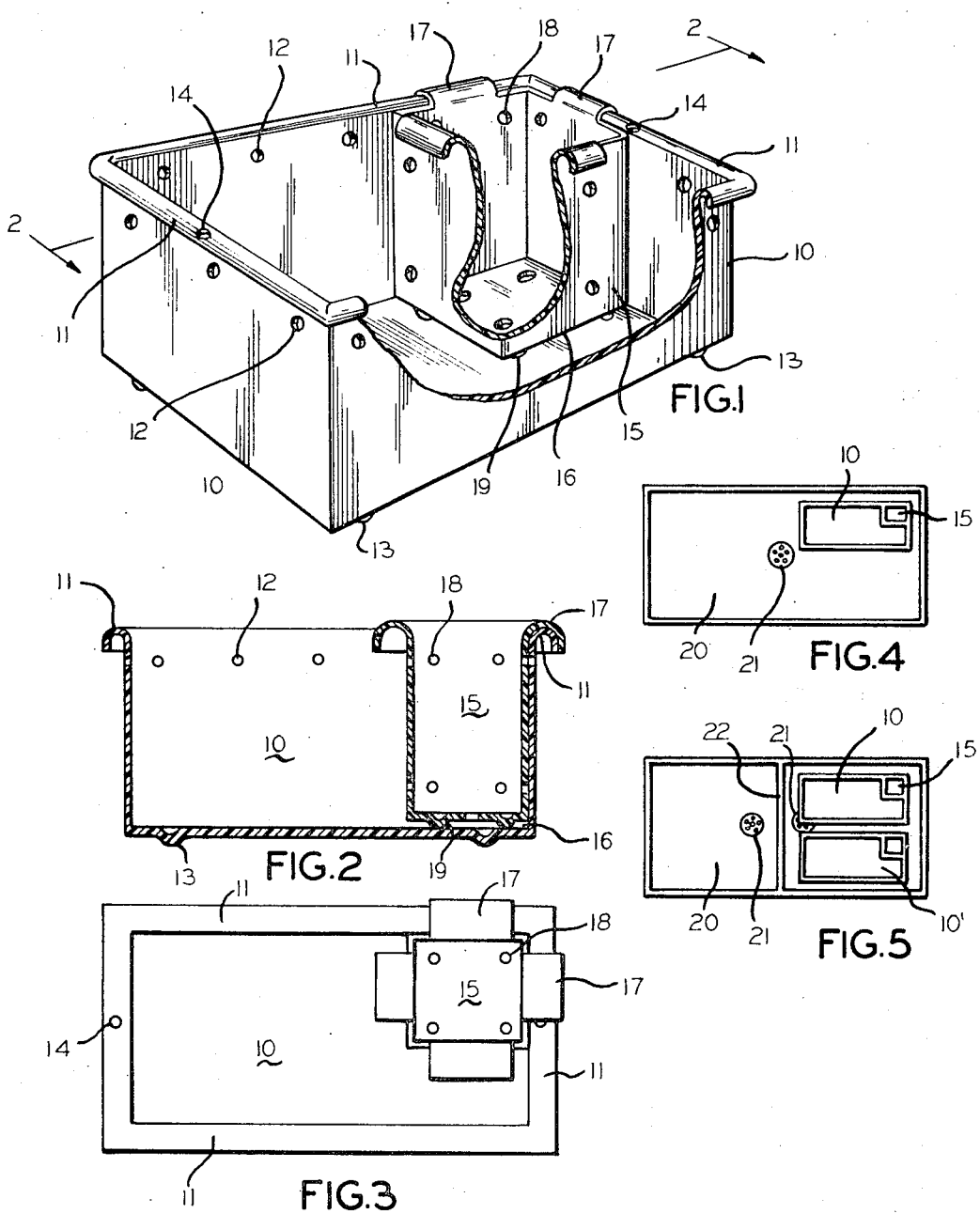

RINSING DEVICE

My invention relates to rinsing devices, and more particularly to dish, plate, and cutlery rinsers that may be placed into a conventional sink.

Dish pans, dish drainers, and the like are, of course, well known and widely used devices. However, there remains a problem in that the dish water becomes soapy and contaminated. Therefore, it becomes necessary to transfer the washed dishes into a rinse of clean water. Then the usual procedure is to remove the washed dishes and stack them dishes in a drainer. However, the rinse water soon becomes as soapy as the dish water, and that is not too satisfactory. More over, there is a practical problem of where to set the dish pan and the rinse pan since sink space is limited.

The conventional dish-pan is round and it takes up a large portion of the rectangular sink area, leaving only a limited amount of space in the corners of the sink for storage or rinsing the dishes and cutlery. The inventive device herein illustrated, described, and claimed is a simple small rectangular dish rinsing unit disposed therein. The structure may be arranged so two units may be used in one sink for washing and rinsing and both may be easily drained for the convenience of the user.

An object of my invention is to provide a device that is adaptable to fit into most types of standard kitchen sinks.

Another object of my invention is to provide a device of the character described with a separate unit for silverware, or cutlery.

Still another object of my invention is to provide a device that may be manipulated with ease, without requiring any special equipment or training.

Other and further objects of my invention will become more apparent as the description proceeds, when taken in conjunction with the drawings, in which:

FIG. 1 is a perspective view (partly in cross-section) of the assembled device constituting my invention;

FIG. 2 is an elongated cross-sectional view of the assembled device taken along line 2—2 of FIG.1;

FIG. 3 is a top plan view of the assembled device, as shown in FIGS. 1 and 2;

FIG. 4 is a schematic top view of a conventional kitchen sink with a centrally disposed drain and the inventive rinsing device in position; and FIG. 5 is another schematic top view as shown in FIG.4, showing a partitioned kitchen sink with the rinsing device in position.

Similar reference characters indicate corresponding parts and features throughout the several views. More particularly, the character 10 identifies a dish rinser, having its upper rolled edge 11 and equipped with overflow apertures 12 through the vertical side walls. Outwardly disposed indentations 13 are formed at the bottom, to keep the rinser 10 raised from the bottom surface of the sink into which it is disposed. The dish rinser 10, may be of any form, shape, or contour, and constructed of any rigid material, such as metal, or plastic molded or formed from a sheet. The unit may be easily removed, or placed into the sink, and if desire, apertures shown as 14 may be placed in the upper radial edges 11, so the entire unit may be stored and hung from a nail, or the like (not shown).

There is another smaller compartment or unit 15, acting as a rinser for cutlery, silver-ware, or the like. Unit 15 rests on the bottom of the dish rinser 10, as shown at 16 in FIGS. 1 and 2. Or alternatively, the cutlery rinser 15 may be supported by radial members 17, which may be placed over the radial edges 11 of the rinser 10. The cutlery rinser 15 is equipped with a plurality of apertures 18 within its walls, and bottom (see FIGS. 1 and 2), and it has outwardly disposed indentations 19 for its support when resting on the bottom of the rinser 10, as shown at 16 in FIG. 2.

FIGS. 4 and 5, are schematic views of conventional kitchen sinks shown as 20, and equipped with a centrally disposed drain 21 shown in FIG. 4. A centrally disposed partition 22, shown in FIG. 5, illustrates the manner in which the rinsing unit may be placed within the sink.

Preferably the rinse pans 10 are generally rectangular and shaped so that two will fit side by side in a conventional sink, as seen in FIG.5. This way, one rinse may be used for dish water, and the other rinse pan may be used for rinse water. Preferably, one of the rinse pans is positioned under a running faucet so that the rinse water may be renewed continuously.

Also, the overflow apertures 12 on one side of the rinse pan should not be in alignment with the overflow apertures on the opposite side. This way, the overflow rinse water will not run from pan 10 through apertures 12 and into mating apertures 12 in pan 10. Likewise, there is no similar path for the dish water overflow to reach the rinse pan.

From the above description it will become manifest that the device is positive in its performance. Although, I have shown a specific construction and arrangement of the parts and features, many changes may be made without effecting the operativeness of the device. Therefore, I reserve the rights to make such changes as I may deem necessary. The appended claims are to be construed to cover all equivalent structures which do not depart from the spirit or the scope of my invention.

I claim:

1. A rinse pan comprising four substantially solid side walls and a solid bottom formed into a generally rectangular pan having a plurality of overflow apertures formed in at least some of the walls thereof near the upper edge thereof, the apertures on one side of said pan being non-aligned with the apertures on the opposite side of said pan whereby two of said pans may be placed side by side and the fluid overflow from apertures in one of said pans will not enter into the overflow apertures in another of said pans, and a smaller compartment independently mounted in said pan for receiving cutlery, a number of communicating passage ways formed in said smaller compartment, whereby fluid in said pan is substantially uniformly distributed through said pan and said compartment.

2. The pan of claim 1 wherein said rinse pan is approximately half of the size of the kitchen sink so that two of said pans may be set side by side in said sink thereby forming a dishwater compartment and a rinse water compartment.

3. The pan of claim 2 wherein said smaller compartment has at least two upper edge peripheries which are rolled over to form hooks that enable said smaller compartment to hang from the upper edges of said rectangular pan.

4. The pan of claim 3 wherein the bottom of both said rinse pan and said smaller compartment have outwardly extending foot members which raise the bottom of said pan and said compartment off the supporting surface.

5. The pan of claim 1 wherein said smaller compartment has at least two upper edge peripheries which are rolled over to form hooks that enable said smaller compartment to hang from the upper edges of said rectangular pan.

6. The pan of claim 1 wherein the bottom of both said rinse pan and said smaller compartment have outwardly extending foot members which raise the bottom of said pan and said compartment off the supporting surface.

* * * * *